United States Patent Office 3,565,714
Patented Feb. 23, 1971

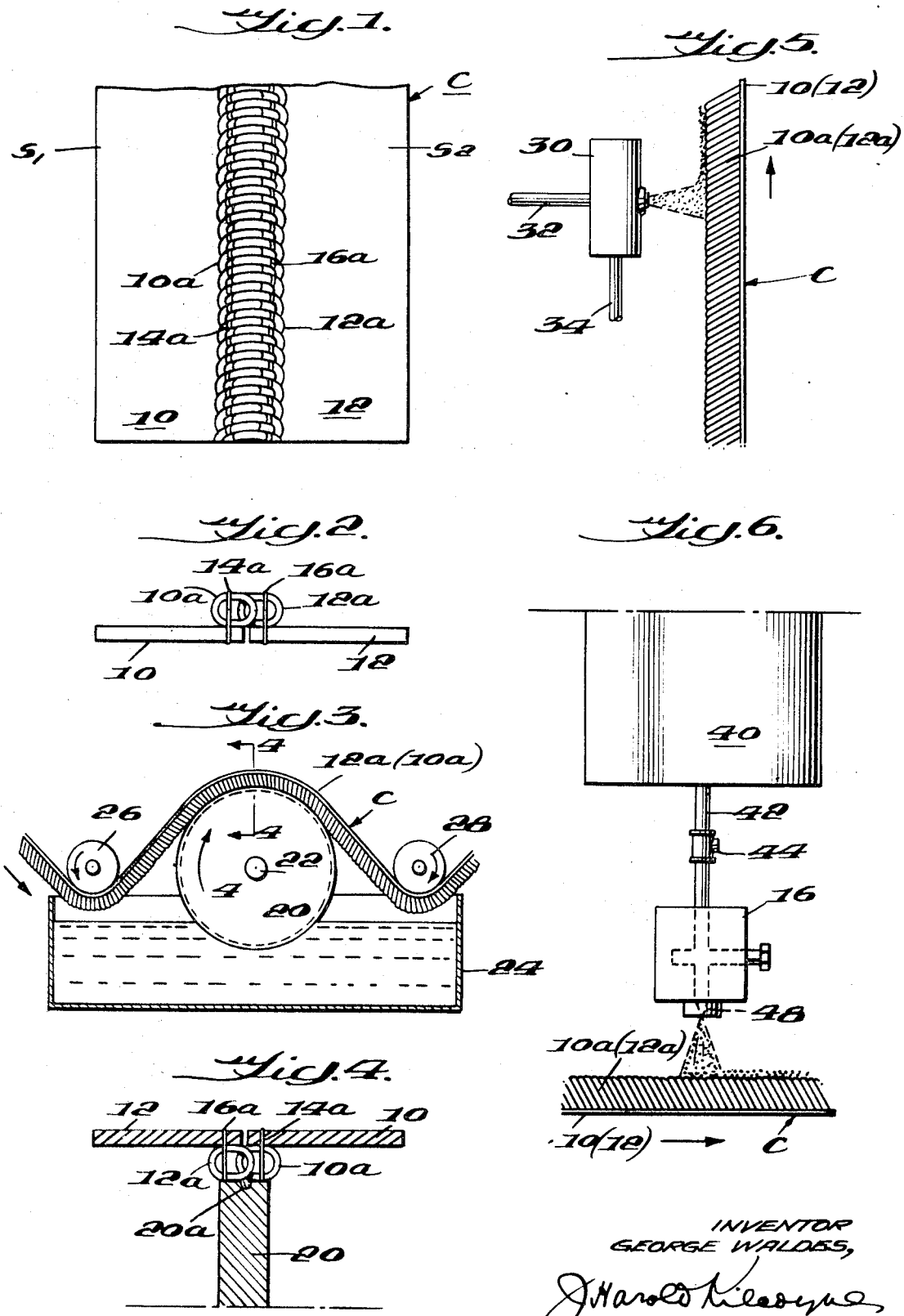

3,565,714
SLIDE FASTENER MANUFACTURE
George Waldes, Plandome, Manhasset, N.Y., assignor to Waldes Kohinoor, Inc., Long Island City, N.Y., a corporation of New York
Filed Dec. 15, 1967, Ser. No. 690,869
Int. Cl. B32b 7/04
U.S. Cl. 156—91                            8 Claims

ABSTRACT OF THE DISCLOSURE

A method of fixing the stitches by which the plastic coils of plastic-coil type slide fastener or zipper chains are secured to their respective tapes thereby to prevent shifting or unloosening thereof, which comprises softening the plastic material of said coils in the upper surface portions of the convolutions of the coils which are traversed by the stitches as they progress along the coils, by the application of a suitable solvent to said surface portions, as permits the threads making up said stitches to bed to a limited degree in the softened plastic material, and thereafter allowing said softened plastic material to reharden, thus to lock the stitches to said coil convolutions.

---

This invention relates generally to slide fastener manufacture and more particularly to the provision of an improved method of positively fixing the stitches by which the plastic coils of plastic coil type slide fastener or zipper chains are secured to their respective tapes in the plastic material of the coils, with the end in view of reducing if not preventing the possibility of the stitches shifting laterally from their initial coil-securing position and/or of unloosening from their tapes adjacent the lines of cut made in cutting a continuous chain to individual zipper lengths.

The problems attendant to the shifting and/or unloosening of the stitches conventionally employed to secure the plastic coils of a plastic coil type slide fastener chain to their respective fabric tapes, and which are also present in the individual zipper lengths cut from such a chain which is usually produced in so-called continuous or long strip form, have been explained in my application Ser. No. 606,142, filed Dec. 30, 1966, which further discloses and claims a solution for such problems in the nature of methods of so fixing said stitches in the plastic material of the coils that the possibility of their shifting out of proper position and/or of unloosening is greatly reduced. However, while effective for their intended purpose, such methods, being dependent on the employment of heat preferably accompanied by pressure to soften and score the plastic material of the coils in the localized top surface areas of the coil convolutions over which the stitches extend, must be carefully controlled and they furthermore required specialized equipment for their successful practice.

Broadly stated, a major object of the present invention is the provision of a method of fixing and/or preventing loosening of the stitches which secure the plastic coils of plastic coil-type slide fasteners or zippers to their respective tapes which is at least as effective as the methods disclosed and claimed in my aforesaid application Ser. No. 606,142, and is moreover faster and easier to control, and capable of being practiced by simpler and more readily available equipment than the methods of my said application.

A more particular object of the present invention is the provision of an effective, fast and easy-to-practice method of softening, by the application of a suitable solvent thereto, the plastic material of the coils of plastic-coil type slide fasteners or zipper chains in the localized areas or surface portions of the successive convolutions making up the coils which are traversed by the threads of the stitches which secure the coils to their respective tapes, as enables said threads to bed themselves in the softened plastic material, thereby positively insuring fixing of the stitches to and in place on the coils when re-hardening of said plastic material takes place.

The above and other objects and advantages of the herein method will be apparent from the following detailed description thereof, taken with the accompanying drawing depicting the type of fastener chain to which the present method is particularly applicable, and further illustrating various means for practicing same, wherein:

FIG. 1 is a fragmentary plan view illustrative of a short length of continuous plastic-coil slide fastener chain to which the method of the invention is particularly applicable, and FIG. 2 is an end view thereof;

FIG. 3 is a broken-away diagrammatic view illustrating one form of means for putting the method of the invention into practice, and FIG. 4 is a section taken on line 4—4 thereof; and FIGS. 5 and 6 are similar views intended to illustrate alternate means for practicing the herein method.

Referring to the drawings in detail, FIG. 1 generally illustrates a plastic-coil slide fastener or zipper chain C to which the present method is applicable as comprising a pair of fastened-together stringers $S_1$ and $S_2$, which in turn are provided by a pair of flexible, usually fabric, tapes 10 and 12 carrying coacting (shown to be engaged) plastic coil-type fastening means 10a, 12a along their adjacent longitudinal edges. As is well understood, the tapes 10, 12 constitute the means for securing individual zipper lengths of chain cut to proper length from said chain C, which latter according to the present manufacturing practice is made up in long, continuous-strip form, to the opposite sides of a garment opening or placket for which the finished zipper comprising said zipper length of chain and an operating slider assembled thereto (not shown) provides a separable closure means.

Referring to FIG. 2 in particular, the aforesaid plastic coils 10a, 12a, which are each formed of a plastic filament shaped to continuous coil or helical configuration, are secured to the adjacent edge portions of their respective fabric tapes 10, 12 by rows of stitches designated 14a, 16a. While any one of the prior art forms of plastic coil-or filament-type fastening means may be employed, the plastic coils shown for purpose of simple disclosure are characterized by somewhat flattened or oval configuration, whose individual loops or convolutions are disposed in generally parallel relation when viewed from above. As the realtively inner-end portions of the loops or convolutions are required to intermesh with one another, the relatively outer-end portions of said loops which are secured by the rows of stitches 14a, 16a locate said coils transversely of their tapes in such position that their said inner-end portions project somewhat beyond the corresponding inner edges of said tapes and thereby in positions such that they are free to intermesh with one another as required. Illustratively, the coils 10a, 12a are secured to their respective tapes each by a single row of the stitches 14a, 16a, which stitches as they progress along the length of the coils, traverse the top surface portion of each of the loops or convolutions making up the coils. As will become evident as the description proceeds, this stitch traversing or crossing-over feature is favorable to the practice of the present method of fixing the threads making up the stitches against undesirable lateral shifting from their proper position and/or loosening adjacent the lines of cut made transversely through the fastener chain in the operation of cutting off individual zipper lengths therefrom, as follows from the fact that areas of the top surface portions of the successive coil convolutions lying to both sides of the crossing-over length portions of the threads making up the securing stitches are available to receive a liquid solvent applied thereto by appropriate means.

More in detail, the present invention provides a method for substantially preventing any undesirable shifting or loosening of said stitches from the plastic coils which they are supposed to secure through the procedure of softening, by the application of a suitable solvent thereto, the plastic material of the convolutions making up same which are traversed by the stitches as they pass over the top portions of said convolutions. As a consequence of this purposeful softening, not only does the softened plastic material of the coil convolutions tend to flow to a limited degree into the fibers or strands of the threads making up the stitches, but also the crossing-over lengths or portions of the stiches will bed themselves in the now softened material of the coils to a degree such that, when subsequent rehardening of the plastic material of the coils is permitted to take place, the so-embedded stitches will be substantially locked or fixed in place and thereby positively prevented from partaking of any substantial lateral shifting away from their initial position assumed to be their optimum securing position, and similarly will be prevented from unloosening from the coils and/or from their respective tapes adjacent transverse lines of cut made through the plastic coils, their tapes, and the lines of stitches which secure same to said tape, in the operation of cutting off individual zipper lengths of chain from the long continuous chain C as produced.

Various means for applying the solvent to the localized areas, i.e. top surface portions, of the plastic coils 10a, 12a which are to receive same according to the invention may be employed. Referring to FIGS. 3 and 4, such illustrate a so-called applicator-wheel means or system for applying the solvent comprising a grooved applicator wheel 20 supported for turning movement in a vertical plane by a tarnsverse supporting axle 22 which is journaled for free rotation in bearings (not shown) set into the side walls, or carried by the top edges of said side walls of a solvent-solution containing tank 24 in which the solution is maintained at a level such that only the lower peripheral-edge portion of the wheel is submerged therein.

The plastic-coil chain C whose coil-to-tape securing stitches 14a, 16a are to be fixed as herein proposed, turned coil-side down and with the coils 10a, 12a thereof disposed in engagement with the upper peripheral edge portion of said wheel 20, is caused to move longitudinally through the top potrion of the tank 24 by suitable pull-through or take-up means (not shown) in a path which includes said upper peripheral portion of the applicator wheel 20. To increase the degree of wrap of the chain C about said applicator wheel, depressor rollers 26, 28 extending into the opposite end portions of the tank at a level above that of the solvent solution contained therein may be provided as shown. As best seen in FIG. 4, the width of the peripheral edge surface of the applicator wheel 20 is substantially equal to the total width of the plastic coils 10a, 12a when the latter are coupled as in FIGS. 1 and 2, and said edge surface is preferably provided with a groove 20a of width and depth calculated to entrain and lift a quantity of the solvent solution sufficient to effectively coat the top surfaces of the coils engaging said edge surface. Such arrangement provides that the applicator wheel will be turned responsive to motion of the chain C through the tank and in turning will pick up in its groove enough of the solvent solution as to coat the top surface portions of convolutions of both plastic coils 10a, 12a traversed by the stitches 14a, 16a with the solvent.

FIG. 5 diagrammatically shows a spray means for applying the softening solvent to the top surface portions of the coil convolutions traversed by the aforesaid stitches 14a, 16a. According to this form of solvent application, the chain C is positively driven in a path disposed at a right angle to that of a spray of the solvent solution emerging from the nozzle of a spray head 30, with which a solvent-solution line 32 and a compressed air line 34 connect. The solvent solution in atomized form is thus directed on to the top surface portions of the successive convolutions which make up the coil and which are traversed by the stitches 14a, 16a as a spray of width not substantially greater than that of the total width of the plastic coils 10a, 12a in their coupled-together relationship, as in FIGS. 1 and 2.

FIG. 6 diagrammatically depicts yet another practical and readily available means for applying the solvent solution to the aforementioned top surface areas of the succesive coil convolutions traversed by the stitches 14a, 16a, which comprises a solvent solution-containing tank 40, a gravity discharge line 42 connected thereto, the flow through which is controlled by a needle valve 44, which line is connected at its lower end to a fitting 46 provided with a discharge orifice 48 adapted to release the solution in droplets and whose diameter is determined by the head and viscosity of the solvent solution contained in said tank.

The fastener chain C whose coil-securing stitches 14a, 16a are to be fixed according to the invention is caused to be moved in a path such that the solvent solution discharging in droplets from the orifice 48 will be directed on to the top surface portions of the successive convolutions of the plastic coils traversed by the aforesaid securing stitches and will thereupon distribute itself as a coating extending to both sides of the crossing portions of said stitches.

As a result of the application of the solvent solution to the top surface portions of the coil convolutions traversed by the stitches 14a, 16a by any one of the above described solvent-applying means, the plastic material of said convolutions will be softened throughout portions or areas thereof disposed to both sides of the crossing portions of the stitches to a limited degree but which is nevertheless by design such as to cause the thus softened plastic material to flow and to be absorbed into the fibers or strands of the threads of the stitches. Softening of the plastic material of the coil convolutions in the areas affected by the solvent further enables the crossing-over portions of the stitches to "bed down" or embed themselves at least partially in the softened plastic material. Thus, when the so-softened plastic material of the coils is allowed to reharden, a firm and secure fixing of the stitches 14a, 16a at each of the multiplicity of the points where the stitches cross over the convolutions of the plastic coil is effected.

As a direct consequence of the stitches which secure the plastic coils to their respective tapes being fixed as aforesaid to said coils, and more specifically to the top surface portions of the coils or convolutions making up said plastic coils, lateral shifting of the stitches with respect to the coil loops or convolutions, which if occurring is likely to interfere with the proper intermeshing of the plastic coils, is positively prevented. Furthermore, when a continuous plastic coil chain treated according to the present invention is cut into a plurality of finished zipper lengths, fixing of the stitches to the plastic coils in accordance with the invention is of advantage in that it positively prevents unloosening of the stitches adjacent the lines of cut, as usually results in the coils "springing-up" from their tapes, and thereby facilitates slider assembly on each zipper length cut from the continuous chain.

Fixing of the coil-securing stitches to the plastic material making up the coils 10a, 12a of a fastener chain according to the invention yields yet other advantages, for example, those of insuring that the plastic coils of zipper lengths of chain cut therefrom will together form a well defined track for the sliders associated therewith and which serve as the opening and closing means therefor, thus improving slider action, and, by lessening the possibility by the threads of the stitches becoming abraded by the action of the sliders thereon, of prolonging the life of said zippers.

The solvent or solvents used to soften the plastic material of the plastic coils according to the invention will, speaking generally, be chosen as being the one or ones best suited to the plastic material from which said plastic coils are fashioned. Thus, if the coils are fashioned from a polyester-type plastic, the solvent employed may be and preferably is one commonly employed for the purpose of bonding polyester coil to polyester-cotton blended tape or to tapes woven wholly from polyester filaments, such in lieu of sewing the coils to said tapes. Thus, a solution of tri-chlor acetic acid (25 grams) in chloroform (75 grams) used cold, which will dissolve plastic coils fashioned from polyester "heat set" plastic in 24–48 hours and non-"heat set" in 60 minutes, is recommended for plastic coils made of polyester. For a faster acting solvent solution, again for use with polyester coil, tri-fluor-acetic acid pure used cold, or metacresol used hot, is recommended, as each will effect the desired softening in 3–4 minutes.

The various means described in the foregoing for applying the solvent solution will of course be constructed of materials capable of withstanding the action of the chemicals employed in the solvent solution. Thus, said means will be constructed of stainless steel, suitable plastic or other non-corrosive material.

While a preferred procedure of and various means for softening the plastic materials of the plastic coils of a slide fastener chain employing such coils as the fastening means thereof, for the purpose of fixing the stitches by which said coils are secured to their respective tapes of said chain, it is to be understood that changes and modifications may be made therein without departing from the scope of the invention as defined by the following claims.

I claim:
1. The method of fixing the stitches of the rows thereof by which the interengaging plastic coils of a continuous plastic-coil type slide fastener chain are sewn in their respective tapes and which in progressing along the length of the coils traverse the top surface portion of each of the convolutions of said coils, which comprises the steps of:
   imparting motion to said continuous chain in the general direction of its length and in a fixed path and at a uniform rate of travel;
   at a fixed station along said path applying a solvent selected for its ability to effect limited softening of the plastic material from which the plastic coils of the chain are fashioned to the surface portions of the coils which are traversed by said stitches thereby to effect controlled softening of the plastic material of the coils as enables the crossing portions of the stitches to bed themselves in the softened plastic material; and
   allowing the softened plastic material to re-harden about the so-bedded portions of the stitches.
2. The method according to claim 1, wherein the solvent is applied as aforesaid by progressively contacting said top surface portions of the coil convolutions with the upper peripheral portion of a rotating applicator wheel whose lower peripheral portion is immersed in a bath of a solution containing said solvent.
3. The method according to claim 1, wherein the solvent is applied by spraying a solution thereof on to said top surface portions of the coil convolutions.
4. The method according to claim 1, wherein the solvent is applied in the form of droplets of a solution containing said solvent.
5. The improvement in the method of producing plastic-coil slide fastener chain consisting of a pair of elongate continuous tapes having intermeshed plastic coils secured thereto along adjacent edges by longitudinal rows of stitches which cross the top surface portions of the successive convolutions of the plastic coils, which comprises the steps of:
   applying a solvent of a nature as to effect limited softening of the plastic material from which said plastic coils are fashioned to said top surface portions of the convolutions crossed by the stitches, thereby enabling the crossing portions of the stitches to bed themselves in the softened plastic material; and
   allowing the softened plastic material to re-harden about the so-bedded portions of the stitches, thereby to fix said stitches in the re-hardened plastic material.
6. The improved method according to claim 5, wherein the aforesaid application of the solvent is effected by causing the chain to travel in a path such as brings said top surface portions of the convolutions in contact with the upper peripheral portion of a rotating applicator wheel whose lower peripheral portion is immersed in a bath of a solution containing said solvent.
7. The improved method according to claim 5, wherein the solvent is applied by progressively spraying a solution thereof on to said top surface portions of the coil convolutions.
8. The improved method according to claim 5, wherein the solvent is applied by causing the chain to move beneath a nozzle from which a solution thereof flows in droplets on to said top surface portions of the coil convolutions.

References Cited
UNITED STATES PATENTS

| 2,543,111 | 2/1951 | Kuzmick | 264—252X |
| 2,701,222 | 2/1955 | Hetzel et al. | 156—306X |
| 2,735,139 | 2/1956 | Morin | 264—252 |
| 3,001,904 | 9/1961 | Porepp | 156—306X |

LELAND A. SEBASTIAN, Primary Examiner

S. HELLMAN, Assistant Examiner

U.S. Cl. X.R.

156—306